US006408087B1

(12) United States Patent
Kramer

(10) Patent No.: US 6,408,087 B1
(45) Date of Patent: Jun. 18, 2002

(54) CAPACITIVE SEMICONDUCTOR USER INPUT DEVICE

(75) Inventor: Alan Kramer, Berkeley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/006,691

(22) Filed: Jan. 13, 1998

(51) Int. Cl.⁷ .................................................. G06K 9/00

(52) U.S. Cl. ....................... 382/124; 382/126; 382/312; 345/156; 345/158; 345/174; 345/326

(58) Field of Search ................................ 382/125, 126, 382/312; 345/326, 334, 156, 157, 158, 159, 163, 173, 174, 183, 202

(56) References Cited

U.S. PATENT DOCUMENTS

| | | | | |
|---|---|---|---|---|
| 3,564,266 A | * | 2/1971 | Klotz, Jr. ..................... | 250/234 |
| 4,353,056 A | * | 10/1982 | Tsikos ...................... | 340/146.3 |
| 4,525,741 A | * | 6/1985 | Chahal et al. ............... | 348/311 |
| 4,525,859 A | * | 7/1985 | Bowles et al. .............. | 382/205 |
| 4,550,221 A | * | 10/1985 | Mabusth .................. | 178/18.06 |
| 4,641,350 A | * | 2/1987 | Bunn .......................... | 382/124 |
| 4,933,976 A | | 6/1990 | Fishbine ........................ | 382/4 |
| 4,988,982 A | * | 1/1991 | Rayner et al. .............. | 345/173 |
| 5,105,467 A | * | 4/1992 | Kim et al. ..................... | 382/30 |
| 5,133,011 A | | 7/1992 | McKiel, Jr. .................. | 381/43 |
| 5,420,936 A | * | 5/1995 | Fitzpatrick et al. ............ | 382/4 |
| 5,424,756 A | * | 6/1995 | Ho et al. ..................... | 345/158 |
| 5,508,719 A | | 4/1996 | Gervais ....................... | 345/157 |

(List continued on next page.)

FOREIGN PATENT DOCUMENTS

| | | | |
|---|---|---|---|
| EP | 0 813 164 A1 | 6/1997 | ............ G06K/9/00 |
| EP | 0786745 | 7/1997 | |
| EP | 0 790 479 A1 | 8/1997 | ............ G01B/7/00 |
| EP | 0905646 | 3/1999 | |
| JP | 04158434 | * 1/1992 | |
| JP | 10275233 | 10/1998 | |
| WO | WO 9729477 | 8/1997 | |
| WO | WO 9858346 | 12/1998 | |

OTHER PUBLICATIONS

Tartagni, M "A 390 dpi live fingerprint imager based on feedback capacitive sensing scheme".Feb. 1997, IEEE, pp. 200–201, 456.*

European Search Report dated Aug. 9, 2000 (Enclosed).

"A 390 dpi Live Fingerprint Imager Based Upon Feedback Capacitive Sensing Scheme," Tartagni, IEEE International Solid–States Circuit Conference, Col. 40, pp. 200–201, 456, Feb. 1, 1997.

"A Fingerprint Sensor Based Upon the Feedback Capacitive Sensing Scheme," Tartagni et al., IEEE Journal of Solid–States Circuit, vol. 33, No. 1, pp. 133–142, Jan. 1998.

©1997 SGS–Thomson Microelectronics, *TouchChip™ Silicon Fingerprint Sensor*, Nov. 1997, 6 pp.

Press Release Communique De Presse Communicato Stampa Presseinformation, *SGS–Thomson's Silicon Fingerprint Sensor Offers Cost–effective Biometric Solution for Security*, Comdex, Las Vegas—Nov. 17, 1997, 2 pp.

*Primary Examiner*—Leo Boudreau
*Assistant Examiner*—Sheela Chawan
(74) *Attorney, Agent, or Firm*—Lisa K. Jorgenson; Peter J. Thoma

(57) ABSTRACT

A method of and system for providing user input to a computer, or the like, having a display by detecting a change in fingerprint pattern of a user. The system controls the position of a pointer on a display by detecting motion of ridges and pores of a fingerprint of a user and moving the pointer on the display according to detected motion of the ridges and pores of the fingerprint. The system captures successive images of the fingerprint ridges and pores and detects motion of the ridges and pores based upon the captured successive images.

15 Claims, 3 Drawing Sheets

U.S. PATENT DOCUMENTS

| | | | |
|---|---|---|---|
| 5,530,456 A | 6/1996 | Kokubo | 345/175 |
| 5,578,817 A | 11/1996 | Bidiville et al. | 250/221 |
| 5,629,764 A * | 5/1997 | Bahuguna et al. | 356/71 |
| 5,648,781 A | 7/1997 | Choi | 341/176 |
| 5,666,113 A | 9/1997 | Logan | 341/34 |
| 5,801,681 A * | 9/1998 | Sayag | 345/156 |
| 5,808,605 A * | 9/1998 | Shieh | 345/173 |
| 5,828,773 A * | 10/1998 | Setlak et al. | 382/124 |
| 5,838,306 A * | 11/1998 | O'Connor et al. | 345/156 |
| 5,892,838 A * | 4/1999 | Brady | 382/124 |
| 5,956,019 A * | 9/1999 | Bang et al. | 345/173 |
| 5,986,746 A * | 11/1999 | Metz et al. | 356/71 |
| 5,991,431 A * | 11/1999 | Borza et al. | 382/127 |
| 6,002,499 A * | 12/1999 | Corboline et al. | 356/71 |

* cited by examiner

CAPACITIVE SEMICONDUCTOR USER INPUT DEVICE

FIELD OF THE INVENTION

The present invention relates generally to methods of and systems for providing user input to user interfaces for computers and the like, and more particularly to a semiconductor capacitive user input device and method for controlling the position of a cursor or pointer on a display.

DESCRIPTION OF THE PRIOR ART

Pointing devices are commonly used in conjunction with computers to control the movement of graphical cursors on a display screen and to select objects and operate controls displayed on the screen. For desktop computers and workstations, the most commonly used pointing device is a mouse. As is well known, a mouse is moved over a flat surface to control the position of the pointer on the display screen. A mouse includes one or more buttons that may be pressed or clicked to perform operations on objects and controls displayed on the screen.

Recently, small laptop and notebook computers have become very popular. Laptop and notebook computers may be used in conjunction with a docking station so that a standard keyboard, mouse, and CRT display may be used for the user interface. However, laptop and notebook computers are designed to be used while traveling and away from the office or home. In such remote locations, the user does not always have available a flat surface upon which to use a mouse. Accordingly, laptop and notebook computers typically have a built-in pointing device, such as a track ball, touch pad or a pressure-actuated pointing device, such as the IBM TrackPoint (TM) device.

In addition to computers, certain television and set top box systems include a graphical user interface for enabling a user to input information to the system and change or control system settings. The user input device for such systems is typically a hand-held infrared keypad controller. Such controllers may include devices similar to those used in laptop and notebook computers to control the position of a pointer on the television screen.

Track balls, touch pads, and pressure-actuated pointing devices have certain drawbacks. For example, while track balls are compact, they require considerable finger movement to produce large cursor displacements at low velocities. In addition, track balls are mechanical devices that may not be well suited for operation in dirty environments. A touch pad comprises a rectangular surface that is mapped to correspond to a display screen. By touching a location on the touch pad, the user causes the computer to move the pointer to the corresponding location on the screen. Since a typical touch pad is substantially smaller than the screen, accurate positioning of the pointer can be difficult. In order to be usable, a touch pad must be large enough to permit the user to position the pointer accurately. The large size of touch pads makes them difficult or impossible to use in a hand held device such as a television remote control.

Pressure-actuated pointing devices include strain gages or transducers that detect the direction and magnitude of the force of a user's finger on the device. The pointer is moved in a direction corresponding to the direction of the force and at a speed corresponding to the magnitude of the force. Certain individuals have trouble using pressure-actuated pointing devices to position the pointer accurately on the screen. One source of trouble is inertia, whereby the pointer continues to move after the user releases the pressure on the device.

It is an object of the present invention to provide a low-cost, small-sized, non-mechanical pointer position controlling device that overcomes the shortcomings of the prior art.

SUMMARY OF THE INVENTION

The present invention provides a method of and system for providing user input to a computer, or the like, having a display by detecting a change in fingerprint pattern of a user. In one of it aspects, the present invention provides a method of and system for controlling the X-Y position of a pointer on a display by detecting motion of ridges and pores of a fingerprint of a user and moving the pointer on the display according to detected motion of the ridges and pores of the fingerprint. In another of its aspects, the present invention provides Z axis input, such as button clicks, by detecting a widening of fingerprint ridges caused by increased pressure on a detector surface, or by detecting the lifting or the placement of the finger from or on the detector surface.

The method and system of the present invention captures successive images of the fingerprint ridges and pores and detects motion in or changes of the ridges and pores based upon the captured successive images. The method and system of the present invention captures the successive images by scanning an array of sensors, each of the sensors being smaller than the width of an individual ridge of a fingerprint. Preferably, the array of sensors is smaller than the pad of a finger of a user. In the preferred embodiment, each sensor of the array of sensors includes a capacitive element and the system captures the successive images by detecting changes in capacitance of the capacitive elements.

DESCRIPTION OF THE PREFERRED EMBODIMENT

Figure 1:
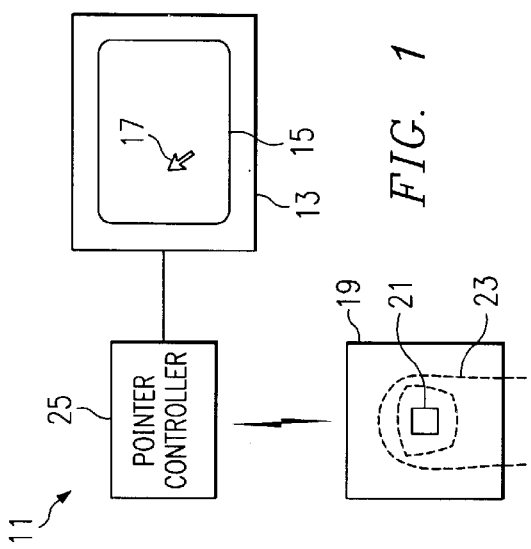
FIG. 1 is a block diagram of a system according to the present invention.

Referring now to the drawings, and first to FIG. 1, a system according to the present invention is designated generally by the numeral 11. System 11 includes a display 13, which includes a screen 15. A pointer 17 is shown displayed on screen 15. System 11 includes a pointer controller 25 that controls the position of pointer 17 on screen 15. Display 13 may be, for example, a standard CRT computer monitor or television. Alternatively, screen 13 may operate on any of several non-CRT technologies used in laptop and notebook computers.

System 11 includes a user input device 19. In FIG. 1, user input device is represented generally as a rectangle. The specific form of user input device 19 is determined by the configuration. For example, user input device may be integrated into the body of a laptop or notebook computer, or it may be part of a hand held infrared remote control device.

User input device 19 includes a sensing element 21. As will be described in detail hereinafter, sensing element 21 senses movement of a user's thumb or finger, shown in phantom and designated by the numeral 23, to control the X-Y position of pointer 17 on screen 15. Sensing element 21 may also sense changes of finger pressure on sensing element, by detecting changes in width of fingerprint ridges, or the placing or lifting of the finger on sensing element 21, to control the Z position of pointer 17 or to input button inputs to processor As shown in FIG. 1, sensing element 21 is substantially smaller than the pad portion of finger 23.

The direction and speed of movement of the finger 23 over sensing element 21 is output to a pointer controller 25. Pointer controller 25 receives output from user input device 19, preferably as X-Y and Z position changes, and produces an output to control the position of pointer 17 on screen 15.

Figure 2:
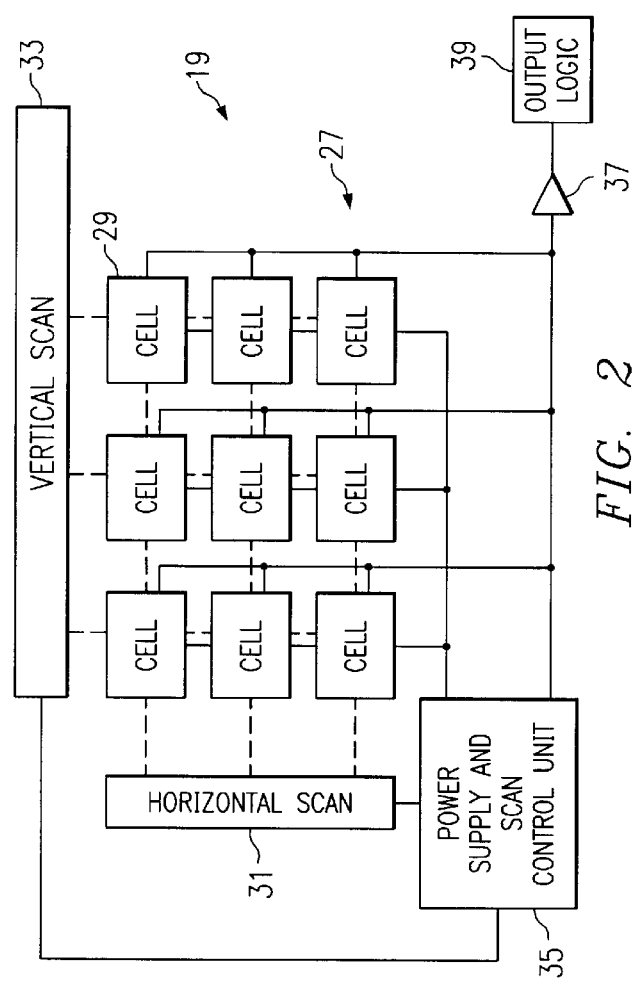
FIG. 2 is a block diagram of a sensor array according to the present invention.

Referring now to FIG. 2, there is shown a block diagram of user input device 19. User input device 19 is preferably integrated into a single chip, and it includes an array 27 of cells 29. For purposes of illustration, array 27 is shown comprising nine cells 29. In an actual device, more than nine cells would be included. Each cell 29 is smaller than the width of a fingerprint ridge and enough cells 29 are included in array 27 so that several ridges and pores may be detected. In the preferred embodiment, cells 29 are on a pitch of 50 μm, which corresponds to a resolution of about 508 dpi.

Device 19 includes a horizontal scanning stage 31 and a vertical scanning stage 33. Scanning stages 31 and 33 enable one cell 29 at the time according to a predetermined scanning pattern. In the preferred embodiment, each cell 29 is scanned once each millisecond to produce a frame rate of 1,000 frames per second.

Input device 19 includes a power supply and scan control unit 35. Power supply and scan control unit 35 supplies a reference voltage to each cell 29 of array 27. Power supply and scan control 35 also operate scanning stages 31 and 33 to produce the desired scanning of cells 29.

An A/D converter 37 is connected to receive the output of each cell 29 of array 27. The output of A/D converter 37 is connected to output logic 39. Output logic 39 processes the output of buffer 37 to capture successive images of a portion of the fingerprint of the user. Output logic 39 compares successive images to detect movement of the fingerprint. If output logic 39 detects movement, output logic 39 computes the displacement of the fingerprint ridges and pores in the X and Y directions over the scanning period, which in the preferred embodiment is one millisecond, and outputs X and Y displacement signals to pointer controller 25 of FIG. 1. If output logic 39 detects a widening or flattening of the fingerprint ridges, which indicates an increase in pressure of the user's finger, or the lifting of the finger from sensing element 21, output logic 39 outputs a Z displacement signal, which pointer controller 25 may interpret as a button press or click.

Array 27 must be a sufficient size to capture a partial image containing several fingerprint ridges and pores. As the finger is moved over array 27, user input device 19 detects, either directly or indirectly, the relative motion of the finger surface. In direct detection, user input device 19 contains motion-detection circuitry that allows it to output directly the relative motion direction and speed of the finger surface. In indirect detection, relative motion between frames is calculated explicitly with a simple correlation algorithm running in a standard digital controller. The higher the frame rates supported by user input device 19, the less motion there will be between frames, even at maximum finger motion speeds, and the easier the task of the correlation algorithm for computing relative motion. At a frame rate of 1,000 frames per second, acceptable results can be achieved using a square array of sensors about five millimeters on a side.

Figure 3:
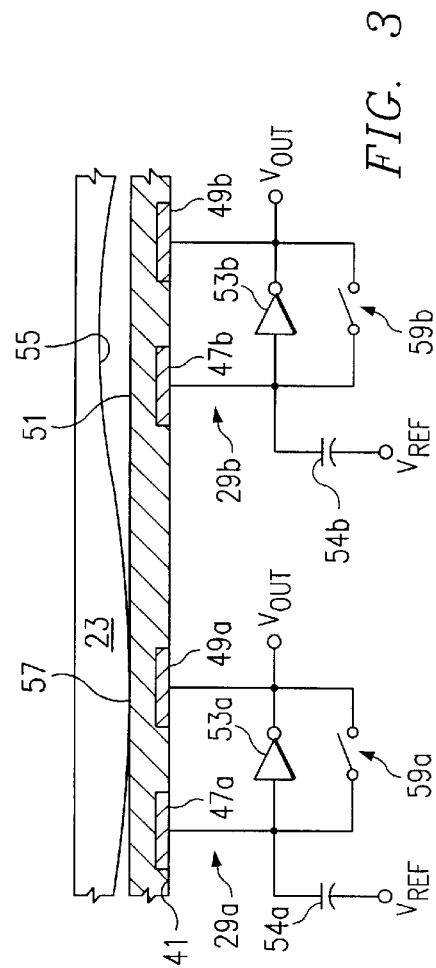
FIG. 3 illustrates the physical structure of the individual sensor cells and their electrical operation according to the present invention.

Referring now to FIG. 3, there is illustrated the structure and operation of a cell 29 according to the present invention. The preferred cell of the present invention is of the type disclosed in Tartagni, U.S. patent application Ser. No. 08/799,543, filed Feb. 13, 1997, entitled Capacitive Distance Sensor, the disclosure of which is incorporated herein by reference. Each cell 29 includes a first conductor plate 47 and a second conductor plate 49 supported on a semiconductor substrate, which is preferably a conventional silicon substrate that may have a conventional shallow epitaxial layer defining an upper surface region thereof. The top surface of the substrate includes an insulating layer 41. Insulating layer 41 is preferably an oxide layer, which may be a conventional thermally grown silicon dioxide layer. Conductor plates 47 and 49 are covered by a protective coating 51 of a hard material. Protective coating 51 protects sensor 29 from abrasion, contamination, and electrostatic discharge.

Each cell 29 includes a high gain inverting amplifier 53. The input of inverter 53 is connected to a reference voltage source $V_{REF}$ through an input capacitor 54. The output of inverter 53 is connected to an output $V_{OUT}$. The input of inverter 53 is also connected to conductor plate 47 and the output of inverter 53 is also connected to conductor plate 49, thereby creating a charge integrator whose feedback capacitance is the effective capacitance between conductor plates 47 and 49.

When a finger 23 is placed on the surface of protective layer 51, the surface of the skin over each sensor acts as a third capacitor plate separated from adjacent conductor plates 47 and 49 by a dielectric layer that includes protective coating 51 and a variable thickness of air. Because fingerprint valleys or pores will be farther from conductor plates 47 and 49 than finger ridges 57, sensors 29 beneath valleys or pores will have more distance between their conductor plates 47 and 49 and the skin surface than sensors under ridges. The thickness of this dielectric layer will modulate the capacitance coupling between plates 47 and 49 of each cell 29. Accordingly, sensors 29 under valleys or pores will exhibit a different effective capacitance than sensors 29 under ridges. As shown in FIG. 3, the effective capacitance of sensor 29a is different from the effective capacitance of sensor 29b.

Sensors 29 work in two phases. During the first phase, the charge integrator is reset with a switch 59 by shorting the input and output of inserter 53. This causes inverter 53 to settle at its logical threshold. During the second phase a fixed charge is input to charge integrator, causing an output voltage swing inversely proportional to the feedback capacitance, which is the effective capacitance between conductor plates 47 and 49. For a fixed amount of input charge, the output of inverter 53 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 29a under ridge 57 will be different from the output of sensor 29b under valley 55.

Figure 4A:
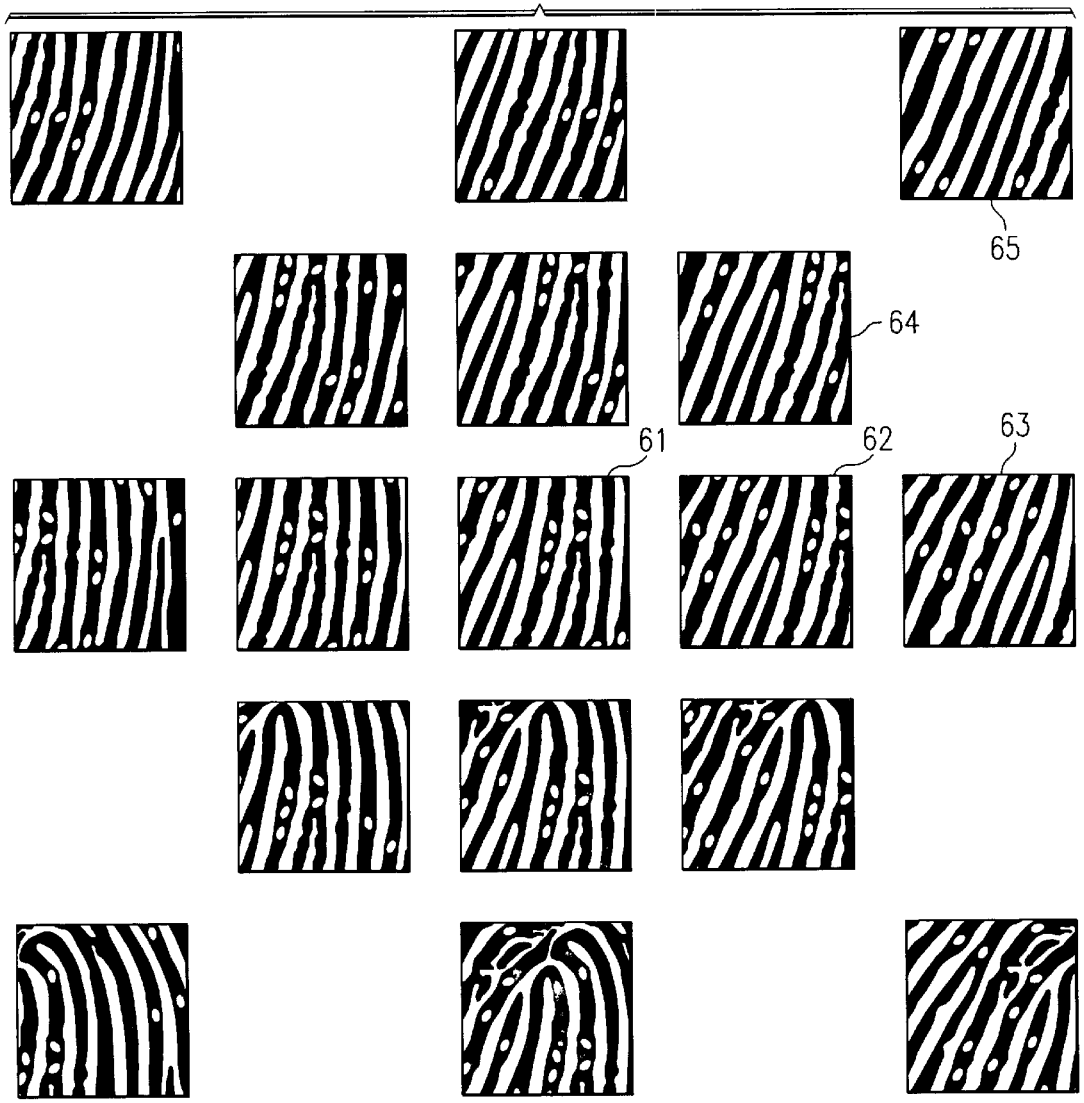
FIGS. 4A and 4B comprise a pictorial illustration of the operation of a system according to the present invention to control the X-Y position of a pointer.
Figure 4B:
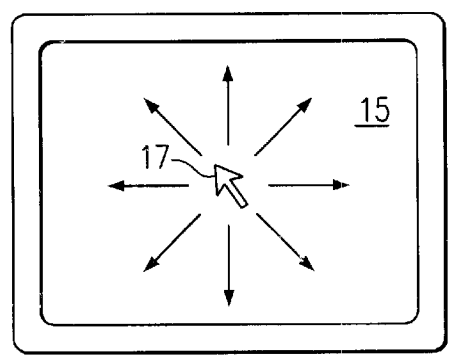

The operation of the system of the present invention to control the X-Y position of pointer 17 on screen 15 is illustrated with respect to FIGS. 4A and 4B, which illustrate the movement of pointer 17 on screen 15 responsive to successive captured images of a portion of a user's fingerprint. In FIG. 4A, an image of a portion of a user's fingerprint is captured by sensing element 21 at an initial time $T_0$ is represented by the numeral 61. In FIG. 4B, pointer 17 is positioned at an initial position at time $T_0$. As the finger is moved over sensing element 21, output logic 39 of FIG. 2 detects a change in position of the dark ridges and/or pores, which are light areas within the dark ridges, and computes displacement the X and Y directions of the ridges or pores over the scanning period and outputs X and Y displacement signals to move pointer 17, as indicated by arrows in FIG. 4B. For example, image 62 of FIG. 4A captured at time $T_1$ shows the ridges and pores displaced a distance $X_1$ in the X direction and a distance 0 in the Y direction. Correspondingly, pointer 17 moves to the right in FIG. 4B. Similarly, image 63 of FIG. 4A shows the image of the ridges and pores captured at a later time $T_2$, wherein the image is displaced a distance $X_2$ in the X direction and a distance 0 in the Y direction. The further movement of the finger causes a corresponding further movement of pointer 17 in the direction of the right arrow of FIG. 4B.

As another example, image 64 of FIG. 4A captured at time $T_1$ shows the ridges and pores displaced a distance $X_1$ in the X direction and a distance $Y_1$ in the Y direction. Correspondingly, pointer 17 moves up and to the right on screen 15 in FIG. 4B. Similarly, image 65 of FIG. 4A shows the image of the ridges and pores captured at a later time $T_2$, wherein the image is displaced a distance $X_2$ in the X direction and a distance $X_2$ in the Y direction. The further movement of the finger causes a corresponding further movement of pointer 17 in the direction of the up and right diagonal arrow of FIG. 4B.

It will be recognized that the present invention detects motion of the finger in all X-Y directions, as shown by the remaining images of FIG. 4A, and that such detected motion causes corresponding movement of pointer 17, as indicated by the arrows of FIG. 4B. Those skilled in the art will recognize that motion in all directions, and not just the forty-five degree directions in the examples of FIGS. 4A and 4B, may be detected. The high resolution provided by the detector of the present invention enables the motion of pores to be detected. The ability to detect pores makes it possible to detect motion in a direction generally parallel to the ridges.

Figure 5:
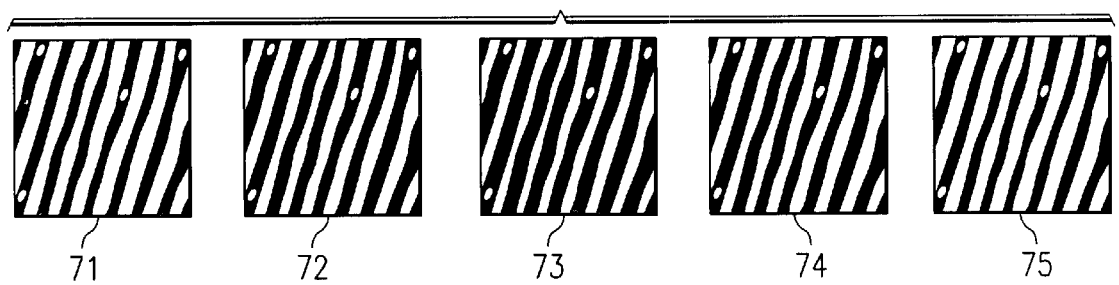
FIG. 5 is a pictorial illustration of the operation of a system according to one embodiment of the present invention to control the Z position of a pointer.
Figure 6:
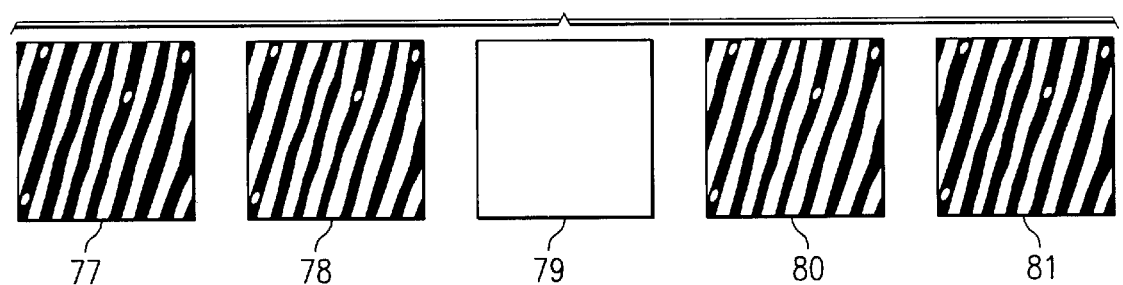
FIG. 6 is a pictorial illustration of the operation of a system according to an alternative embodiment of the present invention to control the Z position of a pointer.

The operation of the system of the present invention to control the Z position of pointer 17 on screen 15 or to perform button clicks is illustrated with respect to FIGS. 5 and 6, which illustrate the change in width of fingerprint ridges responsive increased pressure of a user's finger on sensing element 21. In FIG. 5, an image of a portion of a user's fingerprint is captured by sensing element 21 at a time $T_0$. Image 71 shows narrow ridges, which indicates a light touch on sensing element 21. An image 72 of the user's fingerprint captured by sensing element 21 at a later time $T_1$ shows the ridges and pores is not displaced, but the ridges are wider than those of image 71. Similarly, an image 73 of the user's fingerprint captured by sensing element 21 at a still later time $T_2$ shows the ridges and pores again not displaced, but the ridges are even wider than those of image 72. Images 72 and 73 indicate an increase in finger pressure on sensing element 21. Similarly, images 74 and 75, which are captured at later times $T_3$ and $T_4$, respectively, indicate a decrease in finger pressure on sensing element 21. If the system senses the widened and narrowing of the ridges within a predetermined time period, i.e. $T_4$ minus $T_0$ is less than a preselected value, the system outputs a mouse button click, which is interpreted in the manner well known to those skilled in the art to make user selections and the like.

In FIG. 6 there is shown an alternative embodiment of the Z control of the present invention. An image 77 of a portion of a user's fingerprint is captured by sensing element 21 at a time $T_0$. Image 77 shows fairly wide ridges, which indicates a medium touch on sensing element 21. An image 78 of the user's fingerprint captured by sensing element 21 at a later time $T_1$ shows the ridges and pores is not displaced, but the ridges are narrower than those of image 77, which indicates a lessening of finger pressure on sensing element 21. An image 79, captured by sensing element 21 at a still later time $T_2$ is blank, which indicates that the user's finger has been lifted from sensing element 21. Images 80 and 81, which are captured at later times $T_3$ and $T_4$, respectively, indicate a return of the user's finger pressure on sensing element 21. If the system senses the lifting and return of the ridges within a predetermined time period, i.e. $T_4$ minus $T_0$ is less than a preselected value, the system outputs a mouse button click.

From the foregoing, it may be seen that the present invention is well adapted to overcome the shortcomings of the prior art. The pointer position control device of the present invention is non-mechanical and, therefore, not subject to breakage or mechanical failure. The device of the present invention is small in size, and it may be fabricated on a single integrated circuit chip. The devices small size makes its cost very low compared to devices of the prior art.

Although the present invention has been illustrated and described with respect to a presently preferred embodiment, it is to be understood that various changes, substitutions and alterations can be made therein without departing from the spirit and scope of the invention as defined by the appended claims.

What is claimed is:

1. A method of moving a pointer on a screen of a computer, comprising:

placing a user's finger on a sensing element with a portion of the fingerprint of a pad of the finger in contact with a flat detector surface of the sensing element, wherein the area of the detector surface is substantially smaller than the fingerprint pad of the finger;

capacitively sensing a pattern of ridges of the fingerprint to create a first image of the fingerprint pattern at a first time;

moving the finger to cause the fingerprint to move in a plane parallel to the flat detector surface;

capacitively sensing a pattern of ridges of the fingerprint to create a second image of the fingerpint to create a second image of the fingerprint pattern at a second time;

detecting a change in position on the flat detector surface of ridges of the fingerprint pattern from the first image to the second image;

computing a displacement and direction of displacement of the fingerprint pattern from the first image to the second image; and moving the pointer on the computer screen a distance that is proportional to the computed displacement and in a direction corresponding to the computed direction.

2. The method of claim 1 wherein successive images of the fingerprint pattern are captured at predetermined time intervals to detect the speed and direction of movement of the fingerprint pattern parallel to the flat detector surface from image to image, and wherein the pointer is moved on the computer screen at a corresponding speed and in a corresponding direction during each predetermined time interval.

3. The method of claim 2 further comprising:

capacitively detecting changes in pressure of the fingerprint on the flat detector surface to identify a mouse click command by the user; and sending a mouse click signal to the computer upon the occurrence of the identification of the mouse click command.

4. A method of providing user input to a computer system including a display, comprising:

providing a detector surface adapted to have a fingerprint of a user's finger pressed against it;

providing an array of capacitive sensors beneath the detector surface;

detecting variations in capacitance indicative of variations in a user's fingerprint pattern of ridges and valleys when the user's fingerprint is pressed against the detector surface;

capturing successive images of the user's fingerprint pattern;

detecting motion of the user's fingerprint in a plane parallel to the detector surface by comparing successive images;

determining the direction and speed of the detected motion;

moving a pointer on the display according to the determined direction and speed of motion;

detecting an increase in pressure of the user's finger on the detector surface by comparing the width of fingerprint ridges in successive images of the user's fingerprint; and outputting a mouse click signal to the display whenever a predetermined increase in pressure is detected.

5. The method of claim 4 further comprising:

detecting the lifting and return of the user's fingerprint on the detector surface; and outputting a mouse click signal to the display whenever the lifting and return is detected as having occurred within a predetermined time period.

6. The method of claim 4 further comprising:

scanning the array of capacitive sensors horizontally and vertically according to a predetermined scanning pattern; and amplifying the detected variations in capacitance using amplifiers, each of which corresponds to and is located proximate to a sensor of the array.

7. The method of claim 4 wherein the motion detecting step is carried out by determining displacement of fingerprint ridges and valleys in X and Y orthogonal directions in the plane parallel to the detector surface.

8. A user input device for moving a cursor on a display screen of a computer in response to movement of a user's finger that has a pad portion corresponding to a complete fingerprint, comprising:

a flat detector surface adapted to receive contact by a fingerprint portion of a user's finger, the flat detector surface having an area that is substantially smaller than the fingerprint pad portion of the user's fingerprint;

means for capacitively sensing a pattern of the fingerprint in contact with the detector surface;

means for capturing successive images of the pattern as the fingerprint moves parallel to the detector surface;

means for determining the speed and direction of movement of the fingerprint by comparing successive images; and means for controlling movements of the cursor at a speed and direction on the display screen in response to the speed and direction of movement of the fingerprint parallel to the detector surface.

9. The user input device of claim 8 further comprising:

means for detecting a predetermined change in pressure of the fingerprint against the detector surface; and means for transmitting a mouse click signal to the computer upon detection thereof.

10. The user input device of claim 8 wherein the capacitively sensing means includes:

an array of capacitor plates disposed beneath the flat detector surface; and semiconductor integrated circuitry disposed beneath the array for amplifying and transmitting signals to the capturing means that correspond to changes in capacitance at locations within the array sensed at predetermined time intervals.

11. A system for controlling the position of a pointer on a display screen, comprising:

a user input device for detecting motion of a fingerprint pattern of a user, the user input device including:

(a) a sensing element having a flat detector surface and a two-dimensional array of cells disposed beneath the detector surface, each cell including a capacitive sensor and an amplifier, the capacitive sensor detecting variations in the fingerprint pattern of ridges and valleys of the user's fingerprint when pressed against detector surface, the amplifier producing an output corresponding to the variation in the fingerprint pattern detected by the capacitive sensor;

(b) control circuitry for controlling operation of the sensing element to produce the outputs from the amplifiers; and (c) logic circuitry responsive to the outputs for capturing successive images of the fingerprint pattern at a predetermined frame rate, comparing successive images to detect movement of the fingerprint in X and Y directions parallel to a plane defined by the flat detector surface, and computing X and Y displacement signals corresponding to the movement of the fingerprint between successive images; and a pointer controller in communication with the user input device for receiving the X and Y displacement signals and producing outputs to control the position of the pointer on the display screen;

wherein the logic circuitry includes means for comparing the width of fingerprint ridges in successive images to determine the change in pressure of the user's finger on the detector surface, and for outputting a Z displacement signal to the pointer controller whenever a widening of the fingerprint ridges has been detected, the widening indicating an increase in pressure of the user's finger on the detector surface.

12. The system of claim 11 wherein the logic circuitry includes means for comparing successive images to detect a lifting of the user's finger from the detector surface and a return of touching of the user's finger to the detector surface within a predetermined time period, and for outputting a Z displacement signal to the pointer controller whenever a lifting and return of the user's finger has been detected to have occurred within the predetermined time period.

13. The system of claim 11 wherein each amplifier of each cell is a high gain inverting amplifier having an input and an output, and wherein each capacitive sensor includes a first plate and a second plate, the first plate being connected to the respective amplifier input and the second plate being connected to the respective amplifier output.

14. The system of claim 13 wherein each cell further includes a reset switch for shorting the input and output of each inverting amplifier during a selected phase to cause each inverting amplifier to settle at its logical threshold.

15. The system of claim 11 wherein the control circuitry includes horizontal and vertical scanning stages for enabling one cell at a time to provide an output to the logic circuitry, the scanning stages operating according to a predetermined scanning pattern.

* * * * *